(12) United States Patent
Vrind et al.

(10) Patent No.: US 9,606,833 B2
(45) Date of Patent: Mar. 28, 2017

(54) METHOD AND APPARATUS FOR PROVIDING A PREEMPTIVE TASK SCHEDULING SCHEME IN A REAL TIME OPERATING SYSTEM

(71) Applicant: Samsung Electronics Co., Ltd., Gyeonggi-do (KR)

(72) Inventors: Tushar Vrind, Gyeonggi-do (KR); Balaji Somu Kandaswamy, Bangalore (IN); Raju Siddappa Udava, Bangalore (IN); Venakata Raju Indukuri, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/667,204

(22) Filed: Mar. 24, 2015

(65) Prior Publication Data

US 2015/0293793 A1    Oct. 15, 2015

Related U.S. Application Data

(60) Provisional application No. 61/977,436, filed on Apr. 9, 2014.

(30) Foreign Application Priority Data

Feb. 11, 2015   (KR) .................. 10-2015-0021022

(51) Int. Cl.
   *G06F 9/46*   (2006.01)
   *G06F 9/48*   (2006.01)

(52) U.S. Cl.
   CPC .................. *G06F 9/4887* (2013.01)

(58) Field of Classification Search
   CPC .................. G06F 9/5038; G06F 9/4887; G06F 2209/5021
   USPC .............................................. 718/103
   See application file for complete search history.

(56) References Cited

U.S. PATENT DOCUMENTS

| | | | | |
|---|---|---|---|---|
| 5,168,566 A | * | 12/1992 | Kuki | G06F 9/3851 718/103 |
| 5,371,887 A | * | 12/1994 | Yoshida | G06F 9/3851 718/107 |
| 5,379,428 A | * | 1/1995 | Belo | G06F 8/451 718/103 |
| 5,469,571 A | | 11/1995 | Bunnell | |
| 5,995,997 A | * | 11/1999 | Horvitz | G06F 9/4818 718/102 |

(Continued)

OTHER PUBLICATIONS

Schirner et al. "Introducing Preemptive Scheduling in Abstract RTOS Models using Result Oriented Modeling", 2008, EDAA.*

(Continued)

*Primary Examiner* — Wei Zhen
*Assistant Examiner* — Junchun Wu
(74) *Attorney, Agent, or Firm* — The Farrell Law Firm, P.C.

(57) ABSTRACT

Method and apparatuses are provided for providing preemptive task scheduling for a Real Time Operating System (RTOS). A two-level priority is assigned to each task that is created. The two-level priority includes a kernel priority and a user-defined priority. A priority bitmap corresponding to the kernel priority is created. A priority bit in the priority bitmap is enabled. The priority bit indicates a status of a respective task.

17 Claims, 7 Drawing Sheets

(56) References Cited

U.S. PATENT DOCUMENTS

| | | | | |
|---|---|---|---|---|
| 6,009,452 A * | 12/1999 | Horvitz | G06F 9/4881 | 718/102 |
| 6,282,638 B1 * | 8/2001 | Dowling | G06F 9/462 | 718/108 |
| 6,324,562 B1 * | 11/2001 | Inagaki | G06F 9/4843 | 718/100 |
| 6,360,243 B1 * | 3/2002 | Lindsley | G06F 9/4843 | 718/103 |
| 6,779,181 B1 | 8/2004 | Yu et al. | | |
| 2003/0187905 A1 * | 10/2003 | Ambilkar | G06F 9/30101 | 718/100 |
| 2005/0149933 A1 * | 7/2005 | Saito | G06F 9/4843 | 718/100 |
| 2005/0183085 A1 * | 8/2005 | Sun | G06F 9/4843 | 718/100 |
| 2005/0240924 A1 * | 10/2005 | Jones | G06F 9/5011 | 718/100 |
| 2006/0031838 A1 * | 2/2006 | Chrabieh | G06F 9/4881 | 718/100 |
| 2008/0155537 A1 * | 6/2008 | Dinda | G06F 9/4887 | 718/1 |
| 2008/0235696 A1 * | 9/2008 | Yamamoto | G06F 9/4881 | 718/103 |
| 2008/0244590 A1 * | 10/2008 | Chambliss | H04L 41/0893 | 718/102 |
| 2009/0178042 A1 * | 7/2009 | Mehta | G06F 9/4881 | 718/101 |
| 2009/0254908 A1 * | 10/2009 | Klave | G06F 9/4881 | 718/102 |
| 2011/0078691 A1 * | 3/2011 | Yildiz | G06F 9/461 | 718/103 |
| 2012/0060164 A1 * | 3/2012 | Jiang | G06F 9/4887 | 718/103 |
| 2013/0117756 A1 * | 5/2013 | Kim | G06F 9/4887 | 718/103 |
| 2014/0351820 A1 * | 11/2014 | Lee | G06F 9/4881 | 718/103 |
| 2015/0135184 A1 * | 5/2015 | Cho | G06F 9/4881 | 718/103 |

OTHER PUBLICATIONS

Orozco et al. "Real-Time Operating Systems and Programming Languages for Embedded Systems", Mar. 2, 2012, INTECH.*

Lopez et al. "Stochastic Analysis of Real-Time Systems under Preemptive Priority-Driven Scheduling", 2008, Real-Time Systems.*

* cited by examiner

METHOD AND APPARATUS FOR PROVIDING A PREEMPTIVE TASK SCHEDULING SCHEME IN A REAL TIME OPERATING SYSTEM

PRIORITY

This application claims priority under 35 U.S.C. §119(e) to U.S. Provisional Application No. 61/977,436, filed on Apr. 9, 2014, and a Korean Patent Application filed on Feb. 11, 2015 in the Korean Intellectual Property Office and assigned serial No. 10-2015-0021022, the contents of which are incorporated herein by reference.

BACKGROUND

1. Technical Field

The embodiments herein relates generally to task scheduling for Real-Time Operating Systems (RTOS), and more particularly, to a method and system for preemptive scheduling of tasks in an RTOS.

2. Description of Related Art

In computing technology, scheduling is a method by which threads, processes, or data flows are given access to system resources (e.g., processor time, communications bandwidth). The main target of scheduling is to load balance and share system resources effectively, thereby achieving a target quality of service. An efficient scheduling method is required for systems to perform multitasking and multiplexing effectively and efficiently.

A scheduler is an operating system module that selects the next jobs to be admitted into the system and that selects the next process to run. The scheduler can be categorized as preemptive scheduler or non-preemptive scheduler, based on whether the scheduler is capable of forcibly removing running processes from the CPU or resources, to allocate the CPU or resources to another process.

A preemptive scheduler determines priorities of ready processes/tasks in a system. For example, when a new task becomes ready, and if the priority of the new task is higher than that of the task currently being executed, then the current task is pre-empted, and the new task is given control. The preemptive scheduler is handled by a kernel of the RTOS.

The RTOS assigns a fixed priority rank to every process, and the scheduler arranges the processes in the ready queue in the order of their priority.

Typically, if the number of rankings is limited, then preemptive scheduling can be characterized as a collection of First-In First-Out (FIFO) queues, one for each priority ranking. The processes in lower-priority queues are selected only when all of the higher-priority queues are empty.

SUMMARY

Embodiments have been made to address at least the above problems and/or disadvantages and to provide at least the advantages described below. Accordingly, an aspect of the present disclosure provides a method and system for preemptive scheduling of tasks in an RTOS.

According to an embodiment herein, a method is provided for providing preemptive task scheduling for an RTOS. A two-level priority is assigned to each task that is created. The two-level priority includes a kernel priority and a user-defined priority. A priority bitmap corresponding to the kernel priority is created. A priority bit in the priority bitmap is enabled. The priority bit indicates a status of a respective task.

An apparatus is provided for providing preemptive task scheduling for an RTOS. The apparatus includes a memory, and a processor coupled to the memory. The processing unit is configured to assign a two-level priority to each task that is created, the two-level priority comprising a kernel priority and a user-defined priority, create a priority bitmap corresponding to the kernel priority, and enable a priority bit in the priority bitmap, the priority bit indicating a status of a respective task.

An article of manufacture is provided for providing preemptive task scheduling for an RTOS, including a non-transitory machine readable medium containing one or more programs which when executed implement the steps of: assigning a two-level priority to each task that is created, the two-level priority comprising a kernel priority and a user-defined priority; creating a priority bitmap corresponding to the kernel priority; and enabling a priority bit in the priority bitmap, the priority bit indicating a status of a respective task.

BRIEF DESCRIPTION OF THE DRAWINGS

The above and other aspects, features, and advantages will be more apparent from the following description when taken in conjunction with accompanying drawings in which.

DETAILED DESCRIPTION OF EMBODIMENTS

Figure 1:
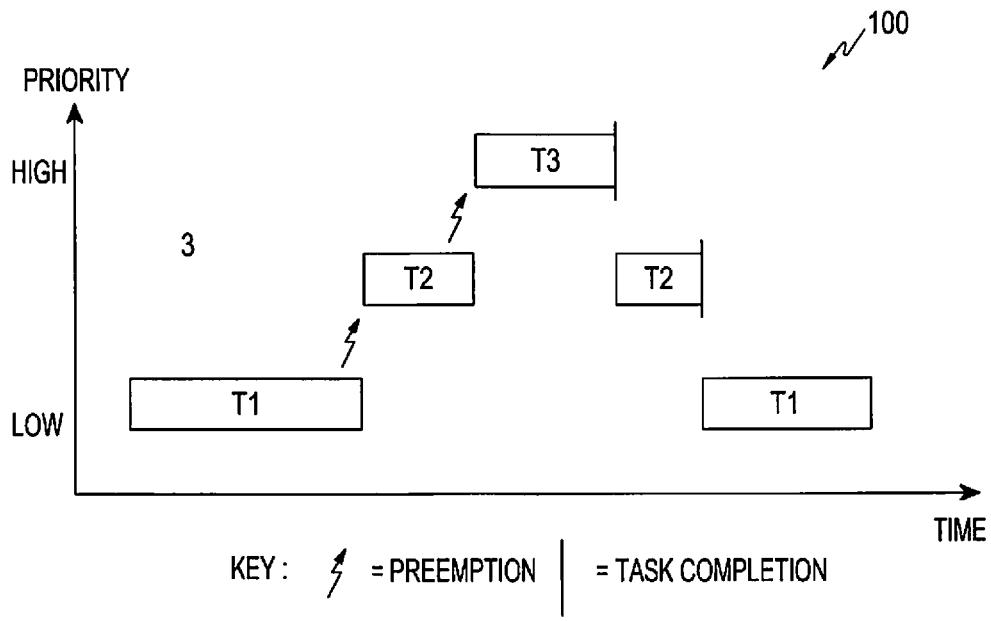
FIG. 1 is a timing diagram illustrating priority based preemption scheduling.

Embodiments are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Herein, reference may be made to "an", "one", or "some" embodiment(s). This does not necessarily imply that each such reference is to the same embodiment(s), or that the feature only applies to a single embodiment. Single features of different embodiments may also be combined to provide other embodiments.

As used herein, the singular forms "a", "an", and "the" are intended to include the plural forms as well, unless expressly stated otherwise. It will be further understood that the terms "includes", "comprises", "including", and/or "comprising", when used herein, specify the presence of stated features, integers, steps, operations, elements, and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

FIG. 1 illustrates a timing diagram 100 of priority based preemption scheduling. Initially, a task T1 is being executed. The system then identifies reception of a second task T2, having a higher priority than task T1. The system then preempts execution of the task T1, to execute the higher-priority task T2. After certain time interval, while the second task T2 is being executed, the system receives a third task T3, which is of higher priority than task T1 and task T2. The system preempts execution of the second ask T2 and executes the third task T3. When execution of the third task T3 is completed, the system resumes execution of the second task T2. When execution of the second t2 is completed, the system resumes execution of the task T1.

Figure 2:
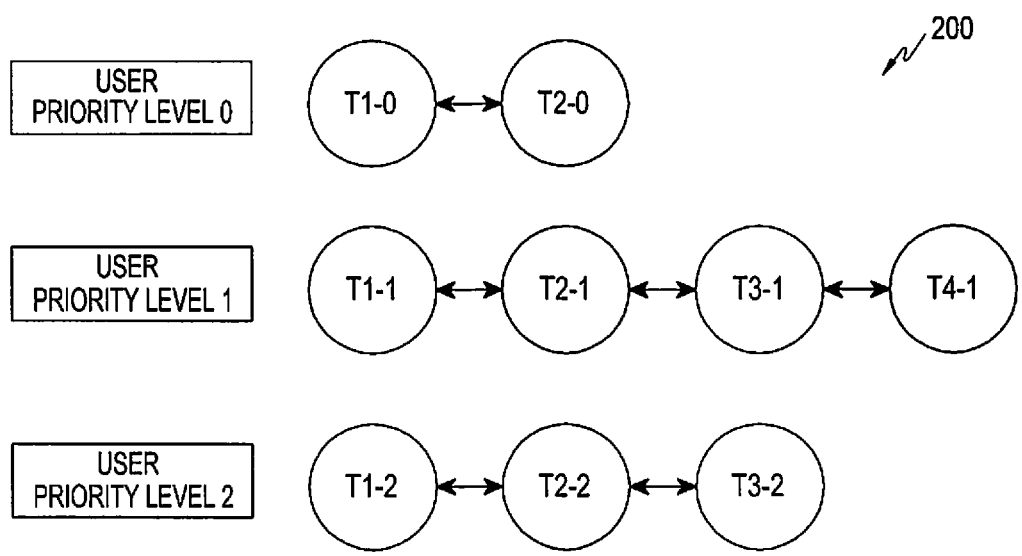
FIG. 2 is a schematic drawing illustrating priority distribution of ready tasks in the preemptive scheduling system.

FIG. 2 illustrates a schematic drawing 200 of priority distributions of ready tasks in the preemptive scheduling system. The priority levels are categorized as level 0, level 1 and level 2. Tasks at Priority level 0 are T1-0 and T2-0. Tasks at priority level 1 are T1-1, T2-1, T3-1 and T4-1, and tasks at priority level 2 are T1-2, T2-2, and T3-2. The priority level 0 is higher priority than level 1 and level 2.

The task control structures for T1-0, and T2-0 have a same priority value, and when there is a decision for picking up a task from the same priority level, a FIFO strategy is applied.

The preemptive scheduler supports multi-tasking priority based scheduling. As discussed above, the process to mark a task as READY generally comprises of two steps:
 a. add task credentials (task block pointer or task identifier) into the FIFO list; and
 b. if this is a first entry into the FIFO list, indicate that a task at this priority level is now READY; (otherwise, the priority level would have already been marked as READY)

The procedure for marking a task as SUSPENDED in the system also involves two steps:
 a. remove task credentials (task block pointer or task identifier) from the FIFO list; and
 b. if this is the last entry in this FIFO list, then indicate that no other tasks are READY at this priority level.

The existing preemptive scheduling methodologies require two level checks to be performed at the scheduler level for getting to the candidate task to be scheduled. The first check is to identify the highest priority level ready list, and the second check is to retrieve a first task (FIFO) in the list of ready tasks at that priority level.

A pre-emptive task is designed with an infinite loop waiting for a resource. When the resource is available the task becomes ready. The scheduler then picks the task for scheduling whenever the priority of the task is the maximum in the current set of ready tasks. Thus, "context saving" is required for all scheduling of tasks.

Generally there are two scenarios in task scheduling where context saving is required:
 a. self-relinquish when the task finishes its job, and returns to wait for a resource state; and
 b. pre-empt due to an interrupt or a high priority task.

In both of the above cases, during context saving, important CPU registers are stored in a stack memory so that during resumption of the task, the CPU can start from where it left.

Another disadvantage is of the existing methodologies is that the context saving and restoring procedures are costly as they affect scheduling latency, and hence should be minimized.

The various embodiments herein disclose a pre-emptive task scheduling mechanism for RTOS. According to an embodiment herein, when created, a task is associated with two distinct priorities, a 'kernel' priority and a 'user-defined' priority. The kernel internally assigns a unique number to each created task based on a preset criteria. If the newly created task satisfies the predefined criteria, the kernel assigns a priority number to the task so that the task can be executed based on its priority.

The user-defined priority is the general task priority as defined by the user or system developer, and hence, can be the same for two or more tasks in the task scheduler system. The user-defined priority can be any number within an allowed priority range for a task scheduler system under consideration. Unused priority in the chosen user-defined priority range are referred to as holes. For example, 5 different tasks in the system can have a user-defined priority of 10, and another 5 different tasks can have a user-defined priority set of 11. The first set of 5 different tasks with the user-defined priority of 10 are executed first. The second set of 5 different tasks is executed only after completion of execution of the first set of 5 different tasks.

The kernel priority can be assigned in ascending order to the tasks, by ensuring the following conditions are satisfied.
 a) no two tasks can have same kernel priority;
 b) a kernel priority of task T1 is higher than that of task T2, if task T1 has a user-defined priority that is higher than that of task T2.
 c) a kernel priorities for two tasks at the same user-defined priority level are allocated based on their task creation order (i.e., First Create First Out (FCFO)).
  Hence, if two tasks (task T1-0 and task T1-1, created in that order) have a same user-defined priority of 'p1', the kernel priority of task T1-0 will be higher than that of T1-1. The kernel priority of these tasks is represented by using a bitmap, referred to as a priority bitmap.

Figure 3:
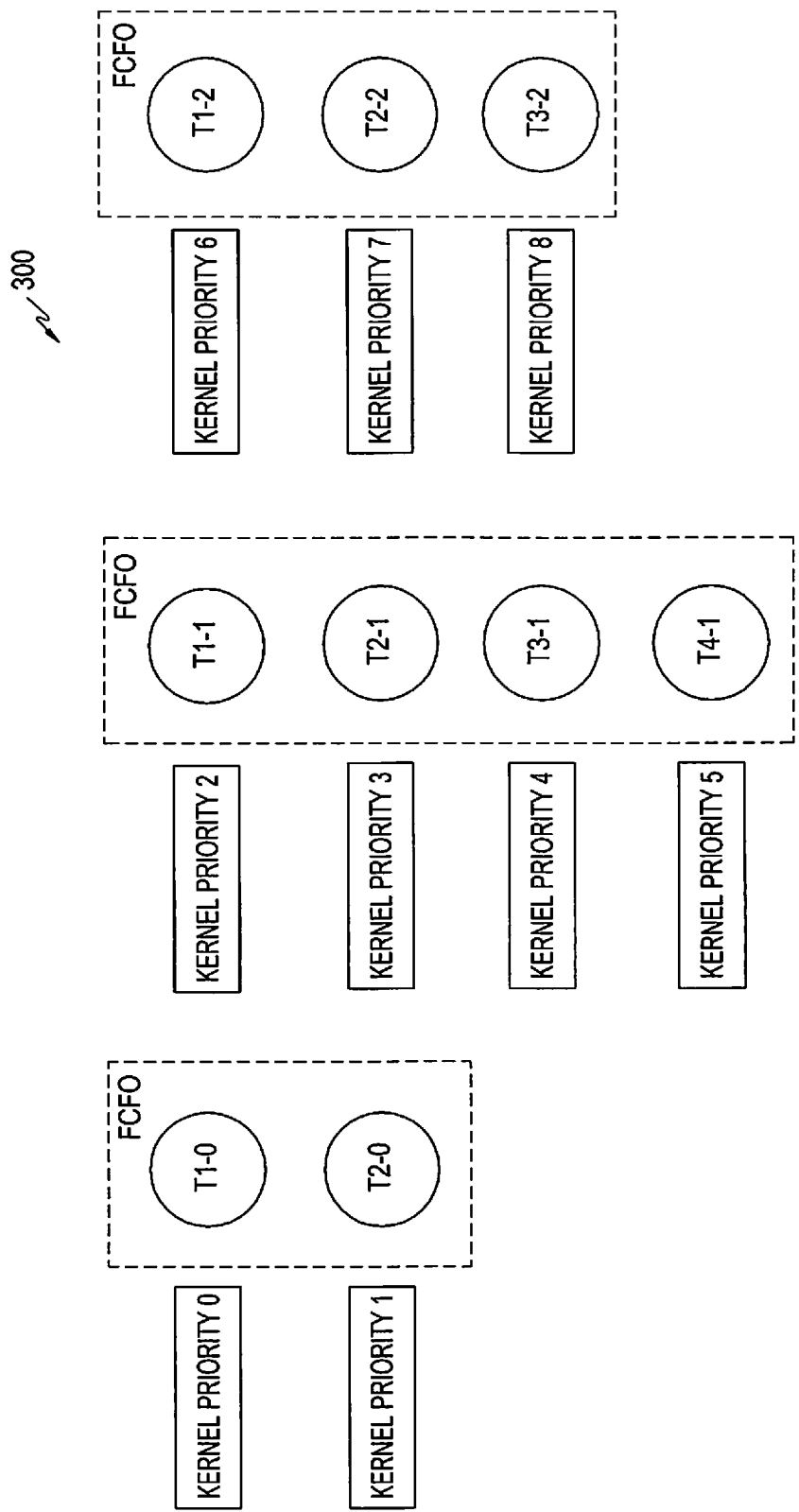
FIG. 3 is a schematic drawing illustrating a task scheduling method for RTOSs, according to an embodiment of the present disclosure.

FIG. 3 is a schematic drawing 300 illustrating a task scheduling method for RTOSs, according to an embodiment of the present disclosure. Tasks T1-0-T2-0, T1-1-T4-1, and T1-2-T3-2 are represented based on both user-defined priorities and kernel priorities. The higher the priority, the lower the assigned number. FIG. 3 shows three (3) different priority lists including user-defined priority 0, user-defined priority 1, and user-defined priority 2. User-defined priority 0 has the highest priority, user-defined priority 1 has a priority that is less than the user-defined priority 0, and user-defined priority 2 has the lowest priority among the three priority lists.

Within the user-defined priority 0 list, tasks T1-0 and T2-0 both have a user-defined priority of 0. Thus, the user has identified both T1-0 and T2-0 as high priority tasks for execution. The user-defined priority 1 list includes four tasks, T1-1, T2-1, T3-1, and T4-1. The tasks T1-1, T2-1, T3-1, and T4-1 have a lower priority than user-defined priority 0 and can be executed once the execution of tasks having a user-defined priority of 0 is completed. The user-defined priority 2 list includes three tasks, T1-2, T2-2, and T3-2. The tasks T1-2, T2-2, and T3-2 have the lowest priority, and therefore, can be executed once all the tasks in the user-defined priority 0 and user-defined priority 1 lists are executed.

Two or more tasks with same user-defined priority are internally assigned a unique kernel priority. The system creates a FCFO list for the tasks having the same user-defined priority. In FIG. 3, the tasks having the user-defined priority of 0 are placed in a first FCFO list, the tasks having the user-defined priority of 1 are placed in second list, and the tasks having the user-defined priority of 2 are placed in a third FCFO list. If two or more tasks with the same user-defined priority are ready for execution at the same time, they are scheduled based on their kernel priority, which is based on task creation order. Therefore, two tasks with the same user-defined priorities are internally prioritized without preempting each other.

In the first FCFO list, the kernel identifies that the task T1-0 is created first, and the scheduler assigns the highest kernel priority of 0 to T1-0 and a kernel priority of 1 to T2-0. Once kernel priorities are assigned for all of the tasks in the first FCFO list, kernel priorities are assigned to the tasks of the second FCFO list. The tasks T1-1, T2-1, T3-1, and T4-1 of the second FCFO list are assigned kernel priorities of 2, 3, 4, and 5, respectively. Similarly, the tasks of the third FCFO list, T1-2, T2-2, and T3-2, are assigned kernel priorities of 6, 7, and 8, respectively.

To ensure that two tasks having the same user-defined priority are not preempting each other, the task scheduler compares a user-defined priority of a currently running task priority with that of a next highest task. This ensures that preemption is avoided between two tasks having the same user-defined priority.

Figure 4:
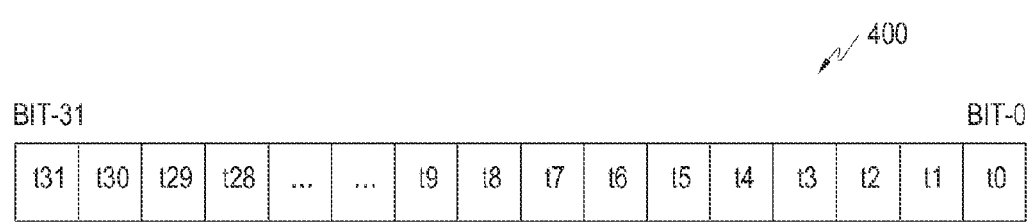
FIG. 4 is a diagram illustrating a priority bit map for scheduling tasks, according to an embodiment of the present disclosure.

FIG. 4 is a diagram illustrating a priority bitmap 400 for scheduling tasks, according to an embodiment of the present disclosure. The priority bit map 400 is a 1-word priority bitmap for tasks that are to be prioritized, preempted, and executed. Since the kernel —priority is a unique incremental number, tasks can be mapped to bits in the priority bitmap on a one-to-one basis. The mapping of tasks with bits in the priority bitmap 400 can begin with a least significant bit (LSB) and end with a most significant bit (MSB). Alternatively, the mapping of tasks with bits in the priority bitmap 400 can begin with the MSB and end with the LSB. The number of bits required to represent the priority bitmap 400 is equal to the number of tasks in the system. If there are 32 tasks, the priority bitmap 400 can be represented using only one word (32 bits).

Further, if the number of tasks in the system that are to be executed is 16, then the priority bitmap 400 includes 16 bits. In another embodiment, if the number of tasks that are to be executed is 8, then the priority bitmap 400 includes 1 byte or 8 bits. A person having ordinarily skill in the art can understand that the number of bits in the priority bitmap 400 can vary according to the number of tasks in the system for execution.

A low priority task is preempted by marking it as "suspended" and executing a higher priority task by marking it as "ready" for execution by the task scheduler system. Therefore, the procedure for marking a task as ready/suspended is simplified into a single step, instead two or more steps.

Further, when the scheduler needs to find a next high priority task for execution, the scheduler searches for the "least bit set" in the priority bitmap 400 with a ready state. Upon finding the task with highest priority in the priority bitmap 400, the scheduler takes up the task and performs execution.

In an embodiment herein, Boolean values 0 and 1, can be used to represent the states of the tasks in the priority bitmap 400. Boolean value 0 is used to represent a suspended state or a completed task state, and Boolean value 1 is used to represent ready, preempted, and running states. If the scheduler receives any new task with a ready state (change in state for task from suspended to ready), then the value 0 of the task is updated to value 1 in the priority bitmap 400. Any change to the priority bitmap 400 invokes the scheduler, which identifies the change in the Boolean value of the task in the priority bitmap 400. The scheduler checks the user-priority of the task, and if the user-priority of the new task with the ready state is higher than the user-priority of a currently executing task, then the task currently under execution is put into a preempted state and the new task is scheduled for execution.

For example, when the scheduler is executing a low priority task t4 having a Boolean value 1 stored in the fifth bit of the priority bitmap, and the scheduler receives another task t1, having a state that changed from suspended to ready, the Boolean value of the task t1 changes from 0 to 1 in the second bit of the priority bitmap. The scheduler identifies the change in the value of the task t1 and identifies that the task t1 is ready for execution. The scheduler compares the priority of the task t4 with that of the task t1 and identifies that the user-defined priority of the task t1 is higher than that of the task t4. The scheduler changes the ready state of the task t4 to a preempted state, but retains the value as 1, since the task t4 is still ready for execution (and contending to execute). The scheduler then takes up the task t1 for execution. The scheduler executes the task t1, and upon completing execution of the task t1, the value of the task t1 is again changed to 0 and the task t4 is changed from the preempted state to the ready state.

Hence, if two tasks (task T1-0 and task T2-0, created in that order) have a same user-defined priority of '0', the kernel priority of task T1-0 will be higher than that of T2-0. The kernel priority of these tasks is represented by using a bitmap, referred to as a priority bitmap.

In an embodiment herein, the scheduler compares the priority of the tasks having ready or suspended states only when the scheduler receives a new task for execution or when the task currently under execution has completed execution and the resources are available for execution of new task. In another embodiment herein, the scheduler checks for any change in the states of the tasks, by checking the Boolean values of the tasks in the priority bitmap, and compares the priority of the tasks to preempt the lower priority tasks by changing its state to suspended and executing higher priority task.

Figure 5:
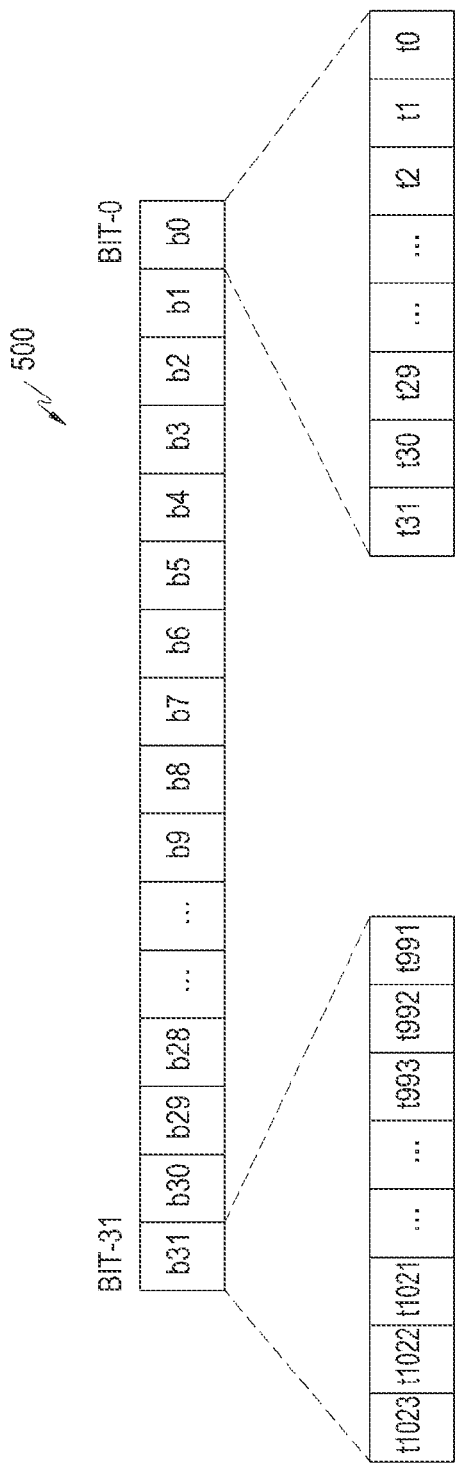
FIG. 5 is a diagram illustrating a two-level priority bit map for scheduling tasks, according to an embodiment of the present disclosure.

FIG. 5 is a diagram illustrating a two-level priority bit map 500 for scheduling tasks, according to an embodiment of the present disclosure. Generally, a size of the priority bitmap increases linearly as the number of tasks in the system increases. In an embodiment of the present disclosure, the multi-level priority bitmap 500 can be used to handle a number of tasks exceeding the number of bits in the priority bitmap 500. The two-level priority bitmap 500 can represent up to 1024 tasks. The first level in the two-level priority bitmap 500 is 1 word long and includes 32 bits. The tasks are divided into task groups of 32 tasks. Each bit of the first level of the priority bitmap 500 represents a task group of 32 tasks. Therefore the 32 bits of the priority bitmap 500 can represent a total of 1024 tasks. For example, an LSB b0 of the first level of the priority bitmap 500 represents a task group of 0 to 31. Similarly bit b1 represents a task group of 32 to 63. Bit 31 represents a task group of 991 to 1023.

Signals in an RTOS can be treated as task level Interrupt Service Routines (ISRs). When a task is being scheduled, it will attend to signals first, if they are raised, before resuming its normal activities. Typically, handling of signals before handling normal activities can be carried out in three states described below:
  a. "Raise" signal can set a flag in task manage control unit;
  b. Add task credentials (task block pointer, or task identifier) for which signals are being raised into the FIFO linked list at its priority level; and
  c. Indicate that a task at this new priority level is now "ready" (if it was first entry into FIFO list).

The present system uses the two priority bit scheme to handle the signals before handling the execution of the tasks. During the creation of a task, instead of reserving one bit for each task in the priority bitmap 500, two bits are reserved. Out of the two bits, one bit is used to indicate signals, and the other bit is used to indicate the task to be executed. The handling of signals should be prioritized over execution of tasks. According to the embodiment herein, raising/clearing signals can be shortened into a single step process, i.e., setting and clearing of a signal-bit associated with that task.

Embodiments can be optimized, for example, for Advanced RISC Machine (ARM) based platforms by representing priority bits in a reverse order, i.e., a MSB representing the highest priority task instead of a LSB, and the LSB representing the lowest priority task instead of the MSB. In a processor implementation, there is a single instruction that can be used to find the LSB, which can save the decision of identifying a high priority task to improve the efficiency.

Figure 6:
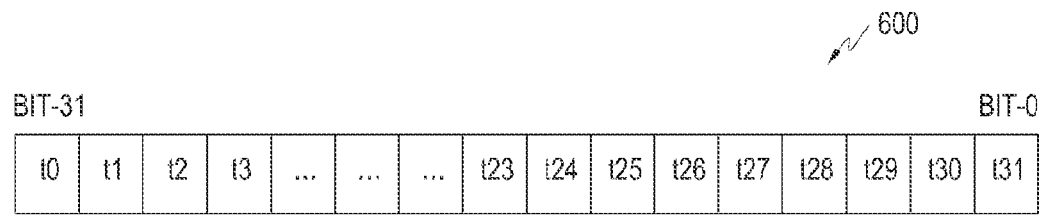
FIG. 6 is a schematic diagram illustrating an arrangement of the priority map in a reverse order for Single Cycle Instruction (CLZ) operation for optimizing task scheduling, according to an embodiment of the present disclosure.

According to an embodiment, "Count Leading Zero's (CLZ)" instruction can be used by the scheduler to optimize the scheduling process, as described with respect to FIG. 6. ARM provides one cycle instruction to CLZ in a 1-word priority bitmap 600. In the priority bitmap 600, bit 31 represents the highest priority task t1, and bit 0 represents the lowest priority task t31. By representing the priority bitmap 600 in a reverse order, the task scheduler can directly identify a next highest ready task by using a single cycle instruction. The priority bitmap 600 can further reduce the complex operation of fetching a task priority list and updating linked list operations provided by existing schedulers to just one cycle instruction, thereby making the scheduling process simple and efficient. In an embodiment, x86 architecture can also use CLZ instruction to optimize the scheduling process.

Figure 7A:
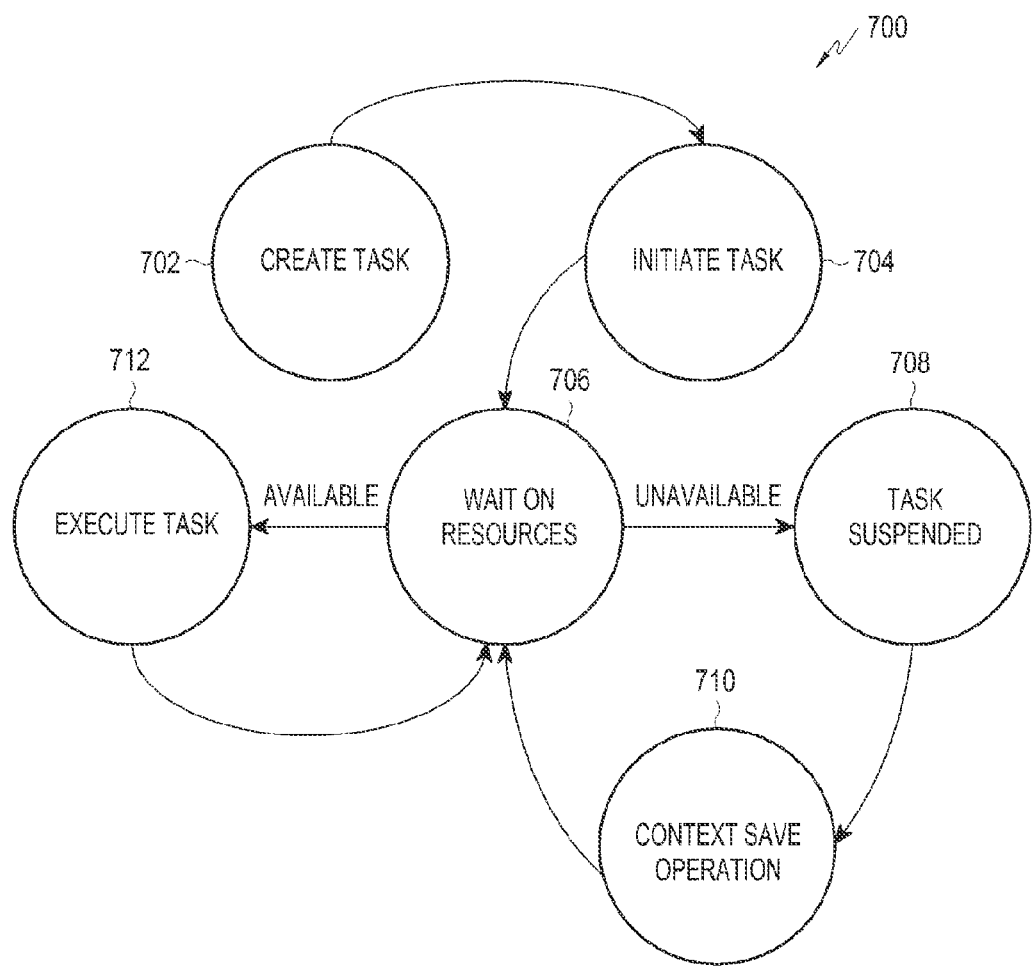
FIG. 7A is a diagram illustrating preemptive task scheduling for an RTOS.

According to another embodiment, the scheduler can perform low latency preemptive task scheduling. According to the existing art, as shown in a methodology 700 of FIG. 7A, a task is created, in step 702, and the task is initiated for execution, in step 704. When a new task with a higher priority arrives for execution, the kernel checks the priority of the task under execution. When the kernel identifies the priority of the task currently under execution as being lower than the new task that is received, the task is preempted and made to wait on resources, in step 706. When the resources go unavailable for the task, then the task is suspended, in step 708. When the preemptive task that suspends itself and waits on a resource, the context is saved in its stack, in step 710. The task for which a resource is available can execute, in step 712. Upon completion of its operation, the task waits on the resource and can again suspend or run, depending on the conditions.

However, storing context can increase storage load on the system, and thereby save unwanted data in the system. Thus, embodiments herein propose a preemptive scheduler scheme that avoids context store operations in the scenario of the task suspending itself and waiting on a resource, by avoiding the need to wait on a loop every time when the task completes its operation. Whenever the task completes its operation and self-relinquishes, the task can exit the task operation completely without having to store any traces of its execution.

Figure 7B:
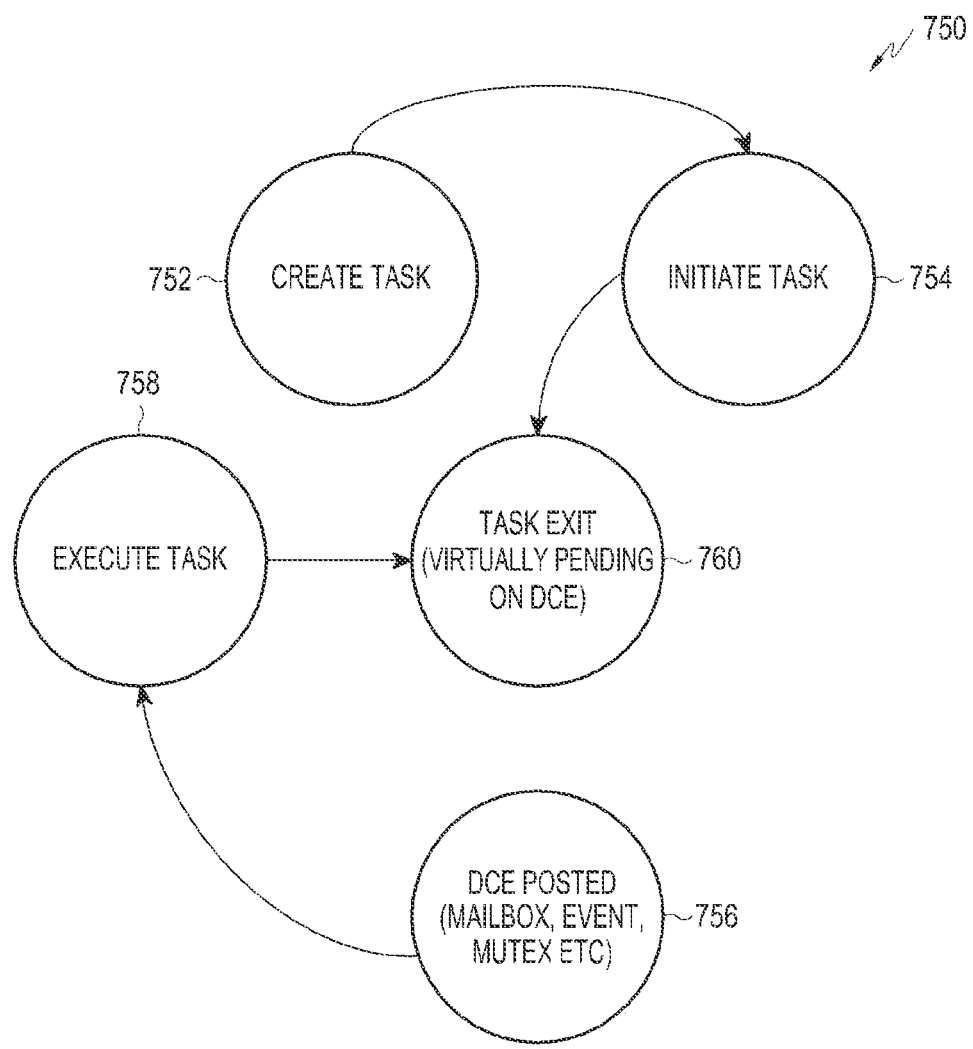
FIG. 7B is a diagram illustrating pre-emptive task scheduling for an RTOS, according to an embodiment of the present disclosure.

FIG. 7B is a diagram illustrating Defaul Communication Entity (DCE) based low latency preemptive task scheduling 750, according to an embodiment of the present disclosure. Every task is associated with one DCE and can be assumed to be suspended on this DCE indefinitely. In an embodiment, the DCE can be one of, but not limited to, queues, events, and the like. During boot-up, once the tasks are created, in step 752, and initiated for execution, in step 754, the tasks are marked to be in suspended states waiting for respective DCEs. Since the tasks are not suspended on a loop every time, the task shall be invoked using its DCE every time. Each time a DCE is posted, in step 756, either from an interrupt sub routine or task, the task associated with the DCE executes from the beginning, in step 758. The task uses its local stack and CPU register for all its operations. Upon completion, the task exits, in step 760, unlike waiting on an indefinite loop pending on a resource. Therefore, the necessity of storing task context (like CPU registers) while scheduling out is avoided. A task context store operation is only required for cases where the executing task has been preempted or is waiting on a non-DCE resource.

Further, to handle any task initialization, which is required based on the system, a task entry initialization function handler can be configured for the task object. The task entry initialization routine can be executed only once at the time of task creation to carry out required initialization, if any. Since a running task can be scheduled out when it self-relinquishes or when it is preempted by an interrupt, the frequency of occurrence of these two scenarios are almost equal in a system. Thus, if a context store operation is avoided when a task self-relinquishes, the latency involved in the operation results in a gain (50% gain for practical purposes) in the overall system operation.

Figure 8:
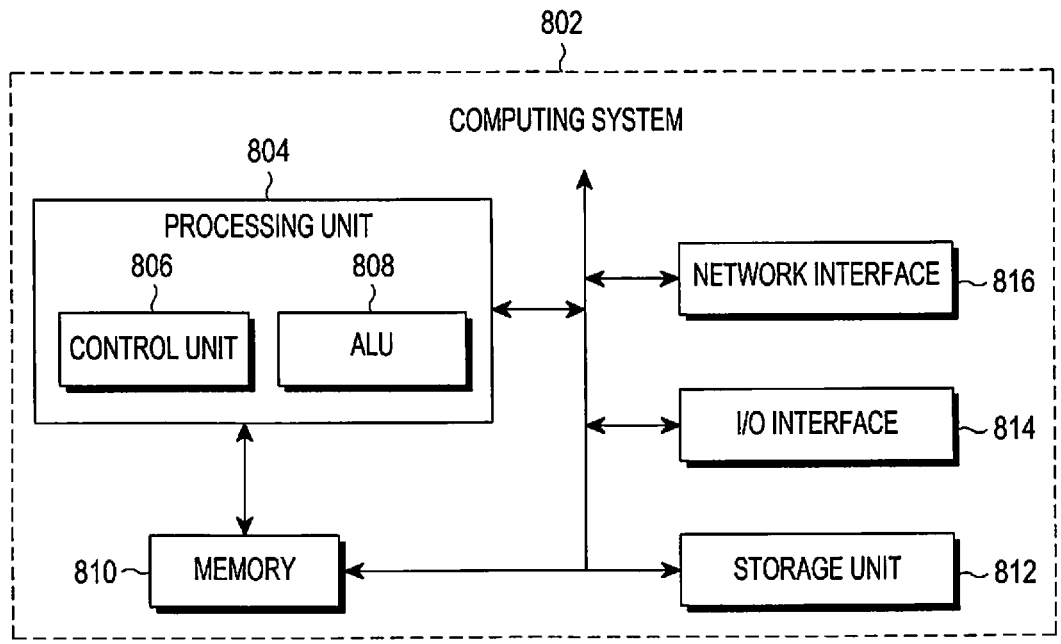
FIG. 8 is a block diagram illustrating a computer system upon which an embodiment may be implemented.

FIG. 8 is a block diagram illustrating a computing environment implementing the method(s), system(s) and User Equipment(s) for providing pre-emptive task scheduling in a real time operating system, according to an embodiment of the present disclosure. As depicted the computing environment 802 includes at least one processing unit 804 that is equipped with a control unit 806 and an Arithmetic Logic Unit (ALU) 808. The processing unit 804 is coupled to a memory 810, a storage unit 812, an Input output (I/O) interface 814 and a network interface 816. The processing unit 804 is responsible for processing the instructions of the algorithm. The processing unit 804 receives commands from the control unit in order to perform its processing. Further, any logical and arithmetic operations involved in the execution of the instructions are computed with the help of the ALU 808. The processing unit 804 may be configured to implement functionality and/or process instructions for execution within the computing system 802. The processing unit 804 may further include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to the processing unit 804, in this disclosure, may be embodied as software, firmware, hardware or any combination thereof. Further, the plurality of processing units 804 may be located on a single chip or over multiple chips.

The processing unit 804 according to the present invention is adapted to assign a two-level priority to each task that is created, the two-level priority comprising a kernel priority and a user-defined priority, create a priority bitmap corresponding to the kernel priority and enable a priority bit in the priority bitmap, the priority bit indicating a status of a respective task. The processing unit 804 is further configured to disable the priority bit in the priority bitmap, wherein enabling the priority bit indicates that the respective task is ready for execution and disabling the priority bit indicates that the task is suspended.

The overall computing system 802 may be composed of multiple homogeneous and/or heterogeneous cores, multiple CPUs of different kinds, special media and other accelerators. The algorithm comprising of instructions and codes required for the implementation are stored in either the memory 810 or the storage unit 812 or both. At the time of execution, the instructions may be fetched from the corresponding memory 810 and/or storage unit 812, and executed by the processing unit 804.

In case of any hardware implementations various networking devices or external I/O devices may be connected to the computing environment to support the implementation through the networking interface 816 and the I/O user interface 814.

The memory 810 may be configured to store information within the computing medium 802 during operation. The memory 810 may, in some examples, be described as a computer-readable storage medium. The memory may be described as a volatile memory, meaning that the memory 810 does not maintain stored contents when the computer is turned off. Examples of volatile memories include random access memories (RAM), dynamic random access memories (DRAM), static random access memories (SRAM), and other forms of volatile memories known in the art.

The storage unit 812 may include one or more computer-readable storage media. The storage unit 812 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 812 may, in some examples, be considered a non-transitory computer-readable storage medium. The term "non-transitory" may indicate that the storage medium is not embodied in a carrier wave or a propagated signal. However, the term "non-transitory" should not be interpreted to mean that the storage device is non-movable. In some examples, the storage device 503 may be configured to store larger amounts of information than the memory 810. In certain examples, a non-transitory storage medium may store data that can, over time, change (e.g., in Random Access Memory (RAM) or cache).

The computing environment 802 may utilize network interface 816 to communicate with external devices via one or more networks, such as one or more wireless networks. The network interface 816 may be a network interface card, such as an Ethernet card, an optical transceiver, a radio frequency transceiver, or any other type of device that can send and receive information. Examples of such network interfaces 816 may include Bluetooth®, 3G and WiFi® radios in mobile electronic devices as well as USB. Examples of such wireless networks may include WiFi®, Bluetooth®, and 3G. In some examples, the computing environment 802 may utilize the network interface 816 to wirelessly communicate with an external device (not shown) such as a server, mobile phone, or other networked electronic device.

The I/O interface 814 allows a user of the electronic device to interact with electronic devices. The I/O interface 814 may generate a graphical user interface ("GUI") that allows a user to initiate commands. In some embodiments, the I/O interface 814 generates a GUI that is displayed on touch sensitive screen ("touch screen"). The GUI may include one or more touch sensitive UI elements. For example, a user may be able to interact with the user equipment and initiate a command by touching one or more of the touch sensitive UI elements displayed on touch sensitive screen and/or hovering over UI elements displayed on touch sensitive screen. The touch sensitive screen may comprise of a variety of display devices such as a liquid crystal display (LCD), an e-ink display, a cathode ray tube (CRT), a plasma display, an organic light emitting diode (OLED) display, or another type of display device.

Various devices, modules, and the like described herein may be enabled and operated using hardware circuitry, for example, complementary metal oxide semiconductor based logic circuitry, firmware, software and/or any combination of hardware, firmware, and/or software embodied in a machine readable medium.

Software components including instructions or code for performing the methodologies described herein may be stored in one or more associated memory devices (e.g., Read Only Memory (ROM), fixed memory, or removable memory) and, when ready to be utilized, loaded in part or in whole (e.g., into Random Access Memory (RAM) and executed by the CPU.

Figure 9:
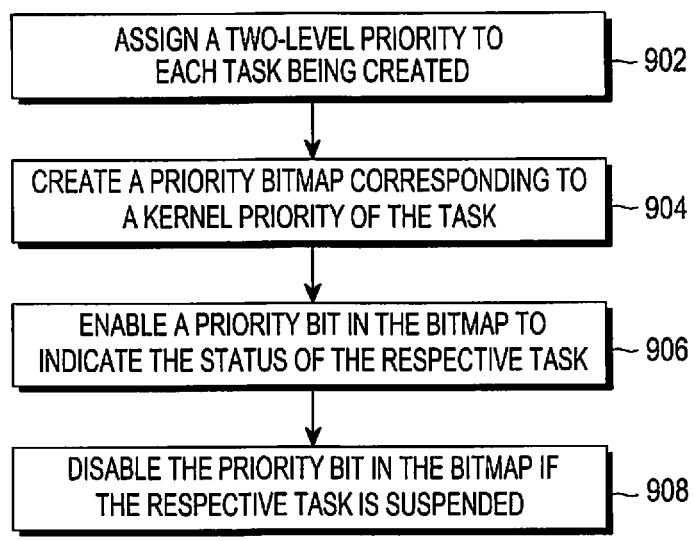
FIG. 9 is a flow diagram illustrating a method for providing preemptive task scheduling in Real-time Operating Systems, according to an embodiment of the present disclosure.

FIG. 9 is a flow diagram illustrating a method for providing preemptive task scheduling in Real-time Operating Systems, according to an embodiment of the present disclosure. At step 902, a two-level priority is assigned to each task that is created. The two-level priority herein includes a kernel priority and a user-defined priority. Further at step 904, create a priority bitmap corresponding to the kernel priority. At step 906, enable a priority bit in the priority bitmap, where the priority bit indicates status of a respective task. Here enabling the priority bit indicates that the task is ready for execution. At step 908, disable the priority bit in the priority map where, disabling the priority map indicates that the respective task is suspended.

The method of assigning two-level priority to each task includes at least one of assigning each task a unique kernel priority, assigning the kernel priority for one or more tasks based on a value of the user-defined priority, and assigning the kernel priorities for two or more tasks having a same user-defined priority based on an order of task creation.

The embodiments herein may be utilized in conjunction with the manufacture of integrated circuits. Regarding integrated circuits in general, a plurality of identical die are typically formed in a repeated pattern on a surface of a semiconductor wafer. Each die may include other structures or circuits. The individual die are cut or diced from the wafer, then packaged as an integrated circuit. One skilled in the art would know how to dice wafers and package die to produce integrated circuits. Integrated circuits so manufactured are considered part of this information.

While certain embodiments have been shown and described herein, it will be understood by those skilled in the art that various changes in form and detail may be made therein without departing from the spirit and scope as defined by the appended claims.

What is claimed is:

1. A method of providing preemptive task scheduling for a Real Time Operating System (RTOS), the method comprising:
   assigning a two-level priority to each task that is created, the two-level priority comprising a kernel priority and a user-defined priority;
   creating a priority bitmap corresponding to the kernel priority;
   enabling a priority bit in the priority bitmap, the priority bit indicating a status of a respective task; and
   executing the task based on the priority bit,
   wherein the kernel priority is a unique incremental number that is assigned to each task being created through a predefined protocol,
   wherein the user-defined priority is the general task priority as defined by the user and can be any number within an allowed priority range for a task scheduler, and
   wherein each task can be mapped to a bit in the priority bitmap on a one-to-one basis.

2. The method of claim 1, further comprising:
   disabling the priority bit in the priority bitmap,
   wherein enabling the priority bit indicates that the task is ready for execution and disabling the priority bit indicates that the respective task is suspended.

3. The method of claim 1, wherein the status of each respective task is one of ready for execution and suspended.

4. The method of claim 1, wherein assigning the two-level priority comprises at least one of:
   assigning each task a unique kernel priority;
   assigning the kernel priority for one or more tasks based on a value of the user-defined priority; and
   assigning the kernel priorities for two or more tasks having a same user-defined priority based on an order of task creation.

5. The method of claim 1, further comprising:
   prioritizing tasks for execution based on a task creation order, if two or more tasks having a same user-defined priority are ready for execution at an instant of time.

6. The method of claim 1, wherein executing the task based on the priority bit comprises:
   identifying a highest priority task for execution, where the highest priority task for execution has a least significant bit in the priority bitmap.

7. The method of claim 1, further comprising:
   allocating at least two bits for each task in the priority bit map, a first bit of the at least two bits being a signal bit and a second bit of the at least two bits being a task priority bit;
   prioritizing signals ahead of tasks based on the allocation of the signal bit and the task priority bit; and
   invoking at least one of a signal handler or resume task based on a value of a next highest priority in the priority bitmap.

8. The method of claim 7, further comprising;
   representing the priority bitmap in a reverse order; where a Most Significant Bit (MSB) of the priority bitmap represents a highest priority task and a Least Significant Bit (LSB) of the priority bitmap represents a lowest priority task; and
   identifying, by a task scheduler, the value of the next highest priority using a single cycle instruction.

9. The method of claim 1, further comprising:
   creating and initializing one or more tasks; and
   assigning a Default Communication Entity (DCE) to each task of the one or more tasks.

10. The method of claim 9, further comprising:
    allowing a task to exit without storing task content, when the task self-relinquishes.

11. An apparatus for providing preemptive task scheduling for a Real Time Operating System (RTOS) comprising:
    a memory;
    a processing unit coupled to the memory and configured to:
        assign a two-level priority to each task that is created, the two-level priority comprising a kernel priority and a user-defined priority;
        create a priority bitmap corresponding to the kernel priority; enable a priority bit in the priority bitmap, the priority bit indicating a status of a respective task; and
        execute the task based on the priority bit,
    wherein the kernel priority is a unique incremental number that is assigned to each task being created through a predefined protocol,
    wherein the user-defined priority is the general task priority as defined by the user and can be any number within an allowed priority range for a task scheduler, and
    wherein each task can be mapped to a bit in the priority bitmap on a one-to-one basis.

12. The apparatus of claim 11, wherein the processing unit is further configured to disable the priority bit in the priority bitmap, wherein enabling the priority bit indicates that the respective task is ready for execution and disabling the priority bit indicates that the task is suspended.

13. The apparatus of claim 11, wherein assigning the two-level priority is based on at least one of:
    assigning each task a unique kernel priority;
    assigning the kernel priority for one or more tasks based on a value of the user-defined priority; and
    assigning kernel priorities for two or more tasks having a same user-defined priority based on an order of task creation.

14. The apparatus of claim 11, wherein the processing unit is further configured to:
    prioritize tasks for execution based on a task creation order, if two or more tasks having a same user-defined priority are ready for execution at an instant of time.

15. The apparatus of claim 11, wherein the processing unit is further configured to:
    allocate at least two bits for each task in the priority bitmap, a first bit of the at least two bits being a signal bit and a second bit of the at least two bits being a task priority bit;
    prioritize signals ahead of tasks based on the allocation of the signal bit and the task priority bit; and invoke at least one of a signal handler or resume task based on a value of a next highest priority in the priority bit map.

16. The apparatus of claim 11, wherein the processing unit is further configured to:
   create and initialize one or more tasks; and
   assign a Default Communication Entity (DCE) to each task of the one or more tasks.

17. A communication device for providing preemptive task scheduling for a Real Time Operating System (RTOS), comprising:
   one or more non-transitory computer-readable media; and
   a processor which, when executing one or more programs stored on the one or more non-transitory computer-readable media;
      assign a two-level priority to each task that is created, the two-level priority comprising a kernel priority and a user-defined priority;
      create a priority bitmap corresponding to the kernel priority;
      enable a priority bit in the priority bitmap, the priority bit indicating a status of a respective task;
      execute the task based on the priority bit,
   wherein the kernel priority is a unique incremental number that is assigned to each task being created through a predefined protocol,
   wherein the user-defined priority is the general task priority as defined by the user and can be any number within an allowed priority range for a task scheduler, and
   wherein each task can be mapped to a bit in the priority bitmap on a one-to-one basis.

* * * * *